(12) United States Patent
Rockwell et al.

(10) Patent No.: US 11,163,786 B2
(45) Date of Patent: Nov. 2, 2021

(54) DATA LAYER ARCHITECTURE, OPEN DATA LAYER MODULE AND TRANSLATION LAYER

(71) Applicant: BAE SYSTEMS INFORMATION AND ELECTRONIC SYSTEMS INTEGRATION INC., Nashua, NH (US)

(72) Inventors: Douglas P. Rockwell, San Diego, CA (US); Michael W. Holm, Escondido, CA (US); Erik Visnyak, San Diego, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 244 days.

(21) Appl. No.: 16/427,939

(22) Filed: May 31, 2019

(65) Prior Publication Data
US 2020/0380006 A1   Dec. 3, 2020

(51) Int. Cl.
| | |
|---|---|
| *G06F 16/00* | (2019.01) |
| *G06F 16/25* | (2019.01) |
| *G06F 9/451* | (2018.01) |
| *G06F 16/2452* | (2019.01) |
| *G06F 16/242* | (2019.01) |
| *G06F 13/20* | (2006.01) |
| *H04L 29/08* | (2006.01) |

(Continued)

(52) U.S. Cl.
CPC ............ *G06F 16/252* (2019.01); *G06F 9/451* (2018.02); *G06F 13/20* (2013.01); *G06F 16/242* (2019.01); *G06F 16/2452* (2019.01); *G06F 16/2455* (2019.01); *G06F 16/8358* (2019.01); *G06F 40/205* (2020.01); *H04L 69/324* (2013.01)

(58) Field of Classification Search
CPC .................................................. G06F 16/8358
See application file for complete search history.

(56) References Cited

U.S. PATENT DOCUMENTS

| | | |
|---|---|---|
| 6,199,068 B1 | 3/2001 | Carpenter |
| 2012/0179711 A1* | 7/2012 | Delafortrie ......... G06F 16/2315 707/769 |

(Continued)

OTHER PUBLICATIONS

International Search Report, PCT/US20/34697, dated Aug. 27, 2020, 11 pages.

*Primary Examiner* — Ajith Jacob
(74) *Attorney, Agent, or Firm* — Sand, Sebolt & Wernow LPA; Scott J. Asmus

(57) ABSTRACT

A computing network data layer architecture or system includes an open data layer module comprising a translation layer. Translation flags are within the translation layer and each flag is associated with a database language of an underlying database that can be coupled architecture or system. The open data layer module is disposed at the lowermost layer of the architecture directly above the underlying backend database. The open data layer module allows for a system to replace or modify its backend databases without affecting the higher level visualization framework or user interface such that a user of the system is unaware which database is utilized or after one database has been replaced or swapped for another even though the databases may be disparate hand have different database language requirements.

18 Claims, 2 Drawing Sheets

(51) Int. Cl.
*G06F 16/2455* (2019.01)
*G06F 40/205* (2020.01)
*G06F 16/835* (2019.01)

(56) References Cited

U.S. PATENT DOCUMENTS

2013/0204849 A1  8/2013  Chacko
2014/0101299 A1  4/2014  Cherel et al.
2016/0344671 A1  11/2016  Hussain et al.
2018/0027006 A1  1/2018  Zimmermann et al.

* cited by examiner

DATA LAYER ARCHITECTURE, OPEN DATA LAYER MODULE AND TRANSLATION LAYER

TECHNICAL FIELD

The present disclosure relates generally to computer network architecture. More particularly, the present disclosure relates to an open data layer module having a translation layer within the network architecture to enable queries to be automatically translated to any type of underlying or backend database. Specifically, the present disclosure relates to a practical application of the open data layer module that enables disparate or different backend databases to be replaced or swapped in a system without affecting higher level layers of the network architecture.

BACKGROUND

A computer network is a digital telecommunications network which allows nodes to share data or resources. In computer networks, computing devices exchange data with each other using connections (data links) between nodes. These data links are established over wired cable media such as wires or optic cables, or wireless media such as Wi-Fi or Bluetooth.

Networks are typically classified in layers. A layer serves the layer above it and is served by the layer below it. For example, a layer that provides error-free communications across a network provides the path needed by applications above it, while it calls the next lower layer to send and receive packets that comprise the contents of that path. Two instances at the same layer are visualized as connected by a horizontal connection in that layer.

The lowest three layers of a network are medial layers. At each level N (i.e., level 1, level 2, level 3, etc.), two entities at the communicating devices (layer N peers) exchange protocol data units (PDUs) by means of a layer N protocol. Each PDU contains a payload, called the service data unit (SDU), along with protocol-related headers or footers. Layer 1 is the lower most layer and is the physical layer is responsible for the transmission and reception of unstructured raw data between a device and a physical transmission medium. Layer 2 is above layer 1 and is the data link layer that provides node-to-node data transfer—a link between two directly connected nodes. Layer 3 is above layer 2 and is the network layer that provides the functional and procedural means of transferring variable length data sequences (called packets) from one node to another connected in "different networks". There are four additional host layers that are above Layers 1-3. Namely, Layer 4: the transport layer, Layer 5: the session layer; Layer 6: the presentation Layer 7: the application layer.

Networks having the seven layers are utilized in both commercial and governmental communications. Regardless of the type of communications, users interact with a user interface to enter data or retrieve data from other nodes or databases within the network.

Databases have differing computer code language depending on the manufacture and requirements. Database languages are special-purpose languages, which allow one or more of the following tasks, sometimes distinguished as sublanguages: Data control language (DCL)—controls access to data; Data definition language (DDL)—defines data types such as creating, altering, or dropping and the relationships among them; Data manipulation language (DML)—performs tasks such as inserting, updating, or deleting data occurrences; Data query language (DQL)—allows searching for information and computing derived information.

Database languages are specific to a particular data model. Notable examples include: SQL combines the roles of data definition, data manipulation, and query in a single language; OQL is an object model language standard (from the Object Data Management Group) and has influenced the design of some of the newer query languages like JDOQL and EJB QL; XQuery is a standard XML query language implemented by XML database systems such as MarkLogic and eXist, by relational databases with XML capability such as Oracle and DB2, and also by in-memory XML processors such as Saxon; SQL/XML combines XQuery with SQL.

A database language may also incorporate features like: DBMS-specific configuration and storage engine management; Computations to modify query results, like counting, summing, averaging, sorting, grouping, and cross-referencing; Constraint enforcement (e.g. in an automotive database, only allowing one engine type per car); and Application programming interface version of the query language, for programmer convenience.

One of the difficulties in the network architecture is for providing for diverse networks interfacing with backend databases that are easy to use and manage.

SUMMARY

One exemplary difficulty for defense solutions and defense applications, but as well as regular commercial communication devices, is the ability for a system to deploy at every echelon level without the need for reformatting underlying code between different programming languages. The echelon's typically form a hierarchy and the lower levels of the echelon hierarchy typically have a smaller footprint that the larger levels. Smaller levels typically would prefer a similar functionality than some of the larger levels of the hierarchy but is undesirable for operators of the lower levels, such as soldiers or individual users, to have to relearn and reapply new code to their node within the echelon hierarchy every time an update or physical movement or change occurs.

In accordance with the exemplary problem, the present disclosure provides a flexible data layer having a common application interface (API), common data structures, and connections for instructions/algorithms in the user interface (UI). Then, the system is configured to enable or structured to swap out backends with ease with a flag in the system at run time to utilize connections to various stacks in the system. Then, if an end user desires a specific solution, the system of the present disclosure can apply this change without needing to change the UI or algorithmic connections. For example, if a customer or user of the system indicates that they already have a specific backend application or module, the system of the present disclosure will be able to integrate with the backend module without any change in how the algorithms or UI were connected to the backend module.

In one aspect, an exemplary embodiment of the present disclosure may provide a computing data layer system or architecture comprising: an open data layer module; a translation layer in operative communication with the open data layer module; translation flags in the translation layer; and a replaceable backend database in operative communication with the open data layer module and the translation layer having a corresponding first translation flag; wherein the open data layer module and the translation layer integrate with a second backend database after the replaceable backend database is removed and the second backend database is connected and the first translation flag is swapped with a second translation flag corresponding the second backend database. This exemplary embodiment or another exemplary embodiment may further provide a user interface (UI) in operative communication with the open data layer module that remains unchanged after the replaceable backend database has been replaced by the second backend database. This exemplary embodiment or another exemplary embodiment may further provide a plurality of nodes within a plurality of echelon layers; and a plurality of links that couple at least some of the plurality of nodes within the plurality of echelon layers together; wherein the UI obfuscates both the replaceable backend database and the second backend data base from a user, and the UI appears similar on at least two different nodes within the plurality of nodes. This exemplary embodiment or another exemplary embodiment may further provide wherein the translation layer integrates with the UI and is adapted to add databases to the computing data layer system without the need to construct a new data layer to add one database. This exemplary embodiment or another exemplary embodiment may further provide wherein the translation layer includes code to integrate and interface with both the replaceable backend database and the second backend database, wherein the code is different for each respective backend database. This exemplary embodiment or another exemplary embodiment may further provide a flexible query language; and a data structure corresponding to the flexible query language adapted to be used throughout an entirety of the computing data layer system. This exemplary embodiment or another exemplary embodiment may further provide a common query language corresponding the UI; and a parser to parse the common query language and apply a parsed query into the flexible query language. This exemplary embodiment or another exemplary embodiment may further provide a plurality of input streams; a pipeline module coupled to the plurality of input streams configured to receive the plurality of input streams therein, wherein the pipeline module is a visual pipelining tool receiving drop boxes therein when data moves through the pipeline module and alters the data such that that pipelines of data translate the data into a common data model; and a messaging bus coupled to open data layer module and coupled to the pipeline module that receives the common data model, wherein the messaging bus is a distributed messaging system adapted to enable messages to be dropped onto the messaging bus and all of the applications connected to the system to see the common data model. This exemplary embodiment or another exemplary embodiment may further provide a natural language processor coupled with the messaging bus adapted to receive text documents and identify entities in a manner that can be extracted in a structured document. This exemplary embodiment or another exemplary embodiment may further provide a messaging bus coupled to open data layer module to feed data into the open data layer module, wherein the open data layer module receives new data from an input and the data that is input is translated in the translation layer to query data into one of the replaceable backend database and the second backend database. This exemplary embodiment or another exemplary embodiment may further provide an alert channel coupled to output links of the messaging bus, wherein the messaging bus places errors on the alert channel coupled with a visualization framework. This exemplary embodiment or another exemplary embodiment may further provide a link connecting the translation layer to the replaceable backend database, wherein link is disposed at a farthest layer of the computing data layer system. This exemplary embodiment or another exemplary embodiment may further provide a batch entity extraction and resolution module coupled to the open data layer module, wherein the batch entity extraction and resolution module utilizes a common application program interface (API) as the open data layer module. This exemplary embodiment or another exemplary embodiment may further provide a messaging bus; and a visualization framework coupled to the open data layer module and the messaging bus, wherein the visualization framework is between the messaging bus and the open data layer module. This exemplary embodiment or another exemplary embodiment may further provide a visualization framework defining the UI in operative communication with the open data layer that query an entry through the open data layer module and the translation layer to retrieve results from the replaceable backend database without requiring a user to know a specific query language and underlying structure of the replaceable backend database. This exemplary embodiment or another exemplary embodiment may further provide wherein the replaceable backend database and the second backend database are disparate databases, and the translation layer translates data for input into the replaceable backend database and the second backend database, respectively. This exemplary embodiment or another exemplary embodiment may further provide wherein the open data layer module is a container executed on a container server.

In another aspect, an exemplary embodiment of the present disclosure may provide a method comprising: ingesting a first set of data in a first format into an open data layer module; translating the first set of data into a second format via a translation layer in operative communication with the open data layer module based on a translation flag associated with the second format corresponding to a first query language of at least one underlying backend database; generating, via the open data layer module, a query for the first set of data in the second format based on query language requirements of the underlying backend database; engaging the first set of data in the second format with the underlying backend database in operative communication with the open data layer module and the translation layer; and maintaining a common user interface within a plurality of displays respectively within a plurality of nodes across an echelon network during translation of first set of data from the first format into the second format. This exemplary method or another exemplary method may further provide replacing the underlying backend database with a second backend database in operative communication with the open data layer module and the translation layer; ingesting a second set of data in the first format into the open data layer module; translating the second set of data into a third format via the translation layer based on a translation flag associated with the third format corresponding to a second query language of at the second backend database; generating a query the for the second set of data in the third format based on query language requirements of the second backend database; and entering the second set of data in the third format into the second backend database.

In yet another aspect, an exemplary embodiment of the present disclosure may provide a computing network data layer architecture or system, which includes an open data layer module comprising a translation layer. Translation flags are within the translation layer and each flag is associated with a database language of an underlying database that can be coupled architecture or system. The open data layer module is disposed at the lowermost layer of the architecture directly above the underlying backend database. The open data layer module allows for a system to replace or modify its backend databases without affecting the higher level visualization framework or user interface such that a user of the system is unaware which database is utilized or after one database has been replaced or swapped for another even though the databases may be disparate hand have different database language requirements.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
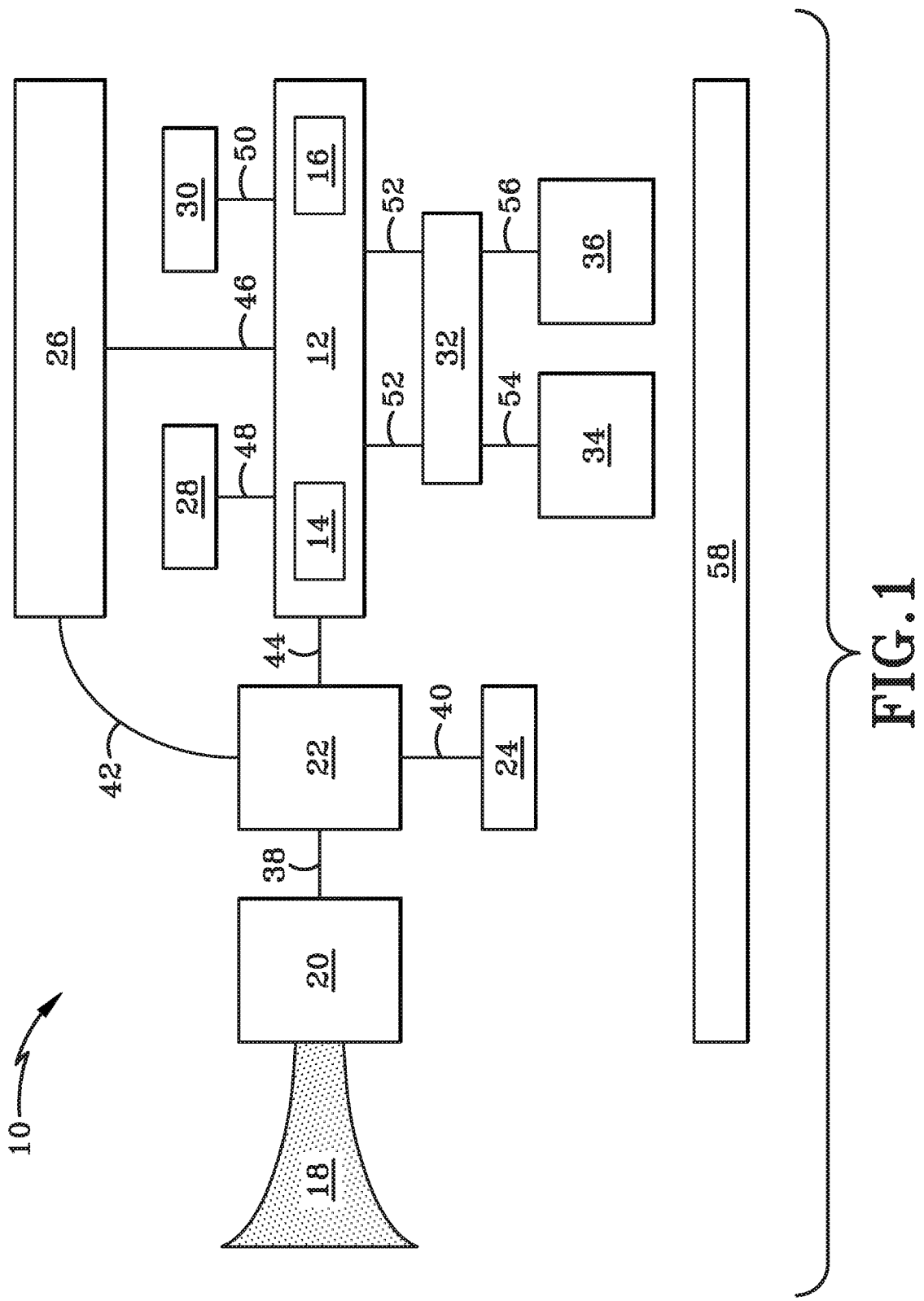
FIG. 1 is a schematic view of a data layer architecture having an open data layer module with a translation layer in accordance with the present disclosure.

FIG. 1 depicts a data layer architecture or system in accordance with one aspect of the present disclosure and is shown generally at 10. Data layer architecture or system 10 includes an open data layer module 12, a translation layer 14, translation flags 16, signal input streams 18, a pipeline tool 20, a messaging bus 22, a natural language processor 24, a visualization framework 26, a work flow management module 28, a batch entity extraction and entity resolution (EE/ER) module 30, a policy enforcement module 32, a first backend database 34 that may be replaceable so as to define replaceable back end database 34, and another backend database 36, which may define a secondary or second backend database 36. As will be described in greater detail below, the replaceable backend database 34 is in operative communication with the open data layer module 12 and the translation layer 14 having a corresponding translation flag 16 such that the open data layer module 12 and the translation layer 14 integrate with the secondary backend database 36 after the replaceable backend database 34 is removed and the second backend database 36 is connected and swapped with a second translation flag corresponding to the secondary backend database 36. The open data layer module 12 operates in a manner to eliminate the need for the user to learn or interact with a different query language after switching databases.

FIG. 1 depicts that the signal input streams 18 are coupled with an input of the pipeline tool 20. The input streams 18 may be any form of data that can be stored in a database or memory. In one particular example, the data streams may be video files, audio files, data files, or combinations thereof. An output of the pipeline tool 20 is coupled via link 38 with an input of the messaging bus 22. All of the links discussed herein, such as link 38 as well as the other links discussed below, may be any wired or wireless connection that effectuates the transfer of data in the form of electrical signals therealong.

Messaging bus 22 includes a port that connects with link 40 to couple the natural language processor 24 to the messaging bus 22. Messaging bus 22 further includes another port coupled with link 42 to couple the messaging bus 22 with the visualization framework 26. Messaging bus 22 includes another port connected with link 44 to an input port of the open data layer module 12.

Visualization framework 26 is additionally coupled to a port of the open data layer module 12 via link 46. Visualization framework 26 is the UI design module that is coupled with the open data layer module 12. Workflow management module 28 is coupled with the open data layer module 12 via link 48. The batch entity extraction and entity resolution (EE/ER) module 30 is coupled with the open data layer module 12 via link 50. The batch EE/ER module 30 may be in the form of instructions or an algorithm. The visualization framework and the batch EE/ER utilize the common API's of the open data layer module 12. The open data layer module 12 works with the visualization framework 26, the workflow management module 28, and the batch EE/ER 30; however, other products may be connected with the open layer data module 12 and installed in conjunction with the open data layer module, the other products would be programmed to the common APIs and the common APIs would never need to be changed if the backend database or cluster changed, or used a different solution on the backend.

Link 52 couples the policy enforcement module 32 with the open data layer module 12. Link 54 couples the first database 34 with the open layer data module 12 through the policy enforcement module 32. Link 56 couples the second database 36 to the open data layer module 12 through the policy enforcement module 32.

Having made reference to the configuration of system 10 and the connections and links coupling the various components together, reference will now be made to the types of or exemplary embodiments of the structures.

With respect to open data layer module 12, the module 12 may be a form of software, logic, or instructions stored on a storage medium and executable by a processor that enable the open data layer module 12 to be considered a flexible data layer. The open data layer module 12 of the present disclosure bridges the gap between disparate databases 34, 36 having differing querying language requirements and may be provided by different suppliers. Typically, providers of databases do not have single end point that can translate into different database languages. For example, if there is a Cloudera database and requiring Hive query language, it would need SQL and if it was entering a Solr database, it would need Lucene. In another example, if the different database (such as the first backend database 34) is an Oracle-based database, then the translation layer 14 will translates the queries to SQL. If the underlying database is a Mongo database, then the translation layer is translating queries into JSON queries. However, any of the other languages are applicable that would allow the translation layer to be able to connect with those disparate sources. Thus, the open data layer module 12 of the present disclosure provides a user with a single data entry at the UI level of the visualization framework 12 that retrieves results or enter data across different disparate data modules or databases (such as 34 or 36) by automatically performing the translation in the translation layer 14 of the open data layer module 12 for the user.

The translation layer 14 may be part of the open data layer module, and as such is depicted as a sub-component within the open data layer module 12. As one having ordinary skill in the art would understand, since the translation layer 14 according to one embodiment is part of the open data layer module 12, it is diagrammatically depicted as being a part of the open data layer module 12. Similarly, one or more translation flags 16 are part of the open data layer module 12. In one particular embodiment, there is an equal number of translation flags 16 for the number of backend databases languages (i.e., a flag for the language of the first backend database 34 and another flag for the language of the second backend database 36) coupled to the open data layer module 12. Thus, in the diagrammatic depiction of FIG. 1, there would be two translation flags 16 with each respective translation flag corresponding to the respective languages of databases 34, 36. Notably, FIG. 1 indicates that the translation flags are shown as a single box within the open data layer module12.

The translation layer 14 may be any number or set of instructions, logic, modules, or algorithms that are configured to translate a query or data set from data input into system 10 so that it may be stored into or retrieved from at least one of the databases 34, 36. As will be described in greater detail below, translation layer 14 provides an automatic and machine implemented translation between a first query language associated generally with the system 10 and a specific query language, that may be different from the generic query language of system 10, that is required for inputting or retrieving data from one of the databases 34, 36. The translation layer 14 effectively enables multiple nodes within an echelon layer of the system 10 to enable various levels of communications to occur without the need for changing query structures.

While additional examples are provided below, a high level example provides that the open data layer module 12 and the translation layer 14 and corresponding translation flag 16 enable different nodes across a communication network to integrate with their respective backend databases by enabling the system to communicate with the dataset stored in the database all while providing a common visualization framework 26 comprising a user interface (UI) such that a user of the system will always observe the same formatted information for interacting with the system 10 without the need of the user to know and understand the underlying query requirements for interaction with one or both of the databases 34, 36. This is especially beneficial or advantageous when the underlying databases 34, 36 are disparate and/or different databases having different and distinct query requirements for execution calls. In this example, the echelon layers within a network are connected to each other through Detrimental Disconnected or intermittent links (D/DIL) that transfer data to and from nodes within a given echelon layer. Within each node, there is a data layer that is an interface over the implementing backend database (such as first backend database 34 and/or second backend database 36). The UI obscures the databases 34, 36 from the user. For example, an end user ordinarily does not know what database or data solution is in the backend. The user ordinarily knows the UI is the same across each node in the echelon layer. Users ordinarily know how to operate relative to the interface or it always returns data in the same format so that it is familiar to the user. The system of the present disclosure obscures or hides the underlying database 34, 36 from the user so the system can use any number of databased behind the UI depending on the desired solution. Thus, the user does not have to understand or alter the background database or directly interact with the background database.

Databases 34, 36 may be any commercial off the shelf (COTS) database. With any COTS database, a translation layer 14 of the present disclosure integrates with the UI so as to allow the ability to add additional solutions to the system without the need to construct a new data layer or build a new algorithm or write new algorithmic instructions executed by a processor in order to add the additional database solutions. Thus, the translation layer 14 acts as an interface to allow backend database solutions into the network with minimal ease and effort. The translation layer 14 is programmed with the necessary coding language to allow different databases having unique, distinct, and/or different coding requirements to integrate with each other across a single network.

The translation layer 14 includes a flexible query language and a data structure that is used throughout the system 10. When the system 10 needs to integrate with a different or disparate databases 34, 36, the translation layer 14 translates the queries to whatever disparate or different coding language that is needed for the other different or disparate database. However, the user always experiences the same API or UI in a single format regardless of the disparate underlying databases or data layers below the translation layer. This is advantageous because this enables the user to not have to know multiple database query languages. All that needs to be known to interact with the API is a common query language that is provided as an overarching data layer. Some exemplary overarching query language as a data layer that would be input into the translation layer could include common directives in a J-SON format that allows for text entry with machine implementing parsing via a parser coupled to the open data layer module 12. However, other bounded search queries in the data layer are also possible.

In operation and with continued reference to this example as it relates to system 10, there are a plurality of input streams 18 formed from of COTS products that feed into the system 10. For example, there is a plurality of different data sources that the system normalizes into a common data model that is stored within the data system of the present disclosure. There is an open-ended structure of the data, which may be in J-SON format or any other suitable format, which allows for different translations and queries to the background databases 34, 36 that are formed with disparate code. The user of system 10 that interacts therewith via the visualization framework or UI has no need to understand or know which background database is being utilized, thus the translation layer 14 of the present disclosure is a module or functionality that eliminates human interaction while improving computer processing functionality.

The pipeline tool 18 receives input information or data that is initially translated into different formats and change the data into what it is desired. This initial translation may be different than what is performed by the translation layer 14 within the open data layer module 12. Thus, the pipeline tool may be considered to perform a pre-processing translation. Additionally, pipeline tool 18 may be a visual pipelining tool that enables a user to drop/upload drop boxes thereon when the data is ran through it. The drop boxes contain data in digital format that can be queried into the database through the use of the translation flag. The drop boxes of data may initially be in a format that is different or disparate from the This dropped/uploaded data is pre-processed (i.e., initially translated) into formats and alters the data so that the pipelines of data are slowly translated into a proper format of a portion of system 10 that is to be considered the ingestion network to integrate and communicate with the different databases 34, 36 so as to establish the common data model. The common data model is then transferred to the messaging bus 22 to ingest it into the open data layer module 12. One exemplary messaging bus 22 is in Cloudera format and another exemplary messaging bus is in Kafka format. The messaging bus 22 is a distributed messaging system that enables messages or data to be dropped onto or input into the messaging bus and all of the applications connected to the system can see the data from the messaging bus 22. The natural language processing device or a natural language processor 24 may be connected with the messaging bus. The natural language processing device 24 receives text documents and identifies entities, items, or portion of data in a manner that can be extracted in a structured document for entry and storage into the at least one of the backed databases 34 or 36.

The data formats that enter the data pipeline tool 18 may be any data format of entry. Some exemplary data formats, include streaming data, databases, XML data, unstructured documents, JSON data, and RSS Feeds. The data pipelines tool 18 can enter this data into the open data layer format required by the open data layer module 12 based on its ontology. This data format is provided to the data pipeline which is a normalization pedigree security marking de-duplication system. The data pipeline tool 18 takes a known data format and can translate it to JSON and move it through a series of translators to massage the data and fan it out and run it down different pipelines based on how the data needs to be handled by different aspects of the system. The information is then sent to the distributed messaging system which is an entity extraction and entity resolution of relationships device. The distributed messaging device enables the system to scale the system at a specific level. For example, as the system is operating over time, if the system determines that it is operating slowly in a specific area by having all of the services being very modular and only doing one thing, then the system can scale individual processes up to make sure that it is able to continue to process in an expedited manner to move the data through the system.

The open data layer module 12 is coupled with the messaging bus 22 that feeds information across the link 44 into the open data layer module 12. The open data layer module 12 receives new data and the data is stored into at least one of backend cluster or databases 34 or 36. The open data layer module 12 translates the data, via translation layer 14, in whatever format the data needs to be in to enter the respective cluster or database 34 or 36 that can be any disparate database or cluster. One of the backend databases 34 or 36 is typically a legacy cluster or backend database already implemented by a user of the system 12. Thus, the open data layer module 12 is configured to be retrofit into an existing legacy communication network or system 10 to allow seamless translation of multiple legacy databases 34, 36 or clusters with a common UI through the open data layer module 12 and the translation layer 14. The open data layer module 12 may generate messages to be sent around the system to other modules or other nodes to notify the other modules or systems in the network that new data has been entered into the database 34 or 36 as translated by the translation layer 14 in the open data layer module 12. Thus, the open data layer module 12 includes algorithms or instructions that observe, detect, or sense new data and perform correlations and normalizations for the data across the entire system.

In one particular implementation, the open data layer module 12 utilizes various COTS database products in an improved manner to connect to disparate backend databases 34, 36 or clusters to easily switch from different technologies stacks. By way of example, module 12 enables the system to switch from a full server farm in the cloud down to a laptop or handheld computer, and every type of computing device therebetween. The open data layer module 12, namely the translation layer 14 in the open data layer module, translates data into each respective language of the backend cluster or database. For example, the translation layer 14 may include programming code to translate from a SQL language to a Mongo language. There may be a translation from SQL to Lucene for a Solr product. However, other translation coding to move data between different or disparate backend clusters or databases 34, 36 are envisioned pending on the type of data transfer needed for the particular system. In one particular embodiment, translations performed by translation layer 14 occur down at or near the farthest ends of the data layer in the echelon network so that at run time the system can different flag (via flags 16) to the system and immediately change what it is connecting to without effecting the rest of the system. With the respect to the term "farthest ends," the present disclosure refers to interfaces within code that are closest to the database or cluster. Thus, the farthest ends refers to the interface layer that is closest to the disparate databases 34, 36 as possible to ensure that the rest of the system does not change or is unaffected when different disparate systems are interchanged with the system 10.

In some implementations, the open data layer module 12 may determine when a different disparate databases (such as 34 or 36) is coupled to the open data layer module 12 based on input by the user. For example, the system may be constructed with the pre-existing knowledge that a Cloudera database is being utilized. However, the system may be updated to be informed that a Mongo database is being utilized after an addition to the network for additional storage of data. Alternatively, the system may implement the plurality of flags 16 to identify to the open data layer module 12 which type of database is being used. For example, if a Cloudera database is being run, a flag associated with the Cloudera database may be provided to the open data layer module 12 so that the translation layer 14 within the open data layer module translates incoming data streams to the Cloudera format. Flags 16 enable the system 10 to update it when a new database (such as second database 36) is installed or replaced without having to do an entire system re-install. For example, if the entire system having the open data layer module 12 with the translation layer 14 and the flags 16 is already implemented and then a customer adds or replaces a new database (i.e., second database 36) or cluster at its backend, then a new flag 16 is implemented that is coupled with the translation layer 14 to instruct the translation layer now to translate data to the updated backend cluster database 36 that has a different or disparate language or code from the previous database or cluster (i.e., first database 34).

In operation and with respect to the translation layer 14 that operates in the open data layer module 12 is accomplished in the following manner. Within different data systems, data is stored in different ways. Furthermore, the data is accessed in different ways as well. As such, there are relational databases that are strict and have set columns and values and other data identifiers. One exemplary database in this manner is an oracle or SQL based database. However, there are other databases that are not SQL based, such as Mongo and Solr, that are very flexible and can almost have indiscriminate data entries but the vast amount of data entry and flexibility makes it difficult to query. Then, there are other types of databases that are specifically made for indexing, such as Solr, that can have a significant amount of data that is told how to index the data and where to apportion it to in specific regions or columns of the database. Many of these database solutions have a powerful advantage in its own right yet there are drawbacks to any database. As such, there are different reasons why a user implementing a computer system may use one database over another.

The present disclosure does not affect the user's choice in which database it wants to implement but rather the open data layer module 12 provides a solution to the user to allow it to use whatever database it chooses to fit its particular needs and enables the overall system 10 to utilize the power of the backend database 34 or 36 (or a different database) with a common UI of the visualization framework 26 without any of the additional requirements that are needed to understand the specific underlying query language of database 34 or 36, or that specific data structure. Thus, the user of the system implementing the open data layer module 12 can effect a record or data entry to be entered (either automatically or manually) and the translation layer 14 queries the data into the proper database without requiring the user of the system to know how to enter the data into said database. Thus, the open data layer module 12, in conjunction with the translation layer 14, will translate the data to be properly stored into the underlying database 34, 36.

The open data layer module 12 may also work in conjunction with a search mechanism or a search module. Within the UI of the visualization framework 26, a user can query a desired keyword. The UI of visualization framework 26 will allow the user to query an entry through the open data layer module 12 and the translation layer 14 will retrieve results from the database 34 or 36 without requiring the user to know the specific query language and structure of the underlying database 34 or 36. For example, the user may enter a key word search and query the underlying database. Then, the keyword will be sent to the open data layer module 12 and the translation layer 14 will generate a query in the proper language format that will retrieve the keyword search from the underlying database 34 or 36 regardless of its data entry query language requirements.

The open data layer module 12 also provides a solution for a scenario where a structured SQL database is being utilized but data being entered by the user at the visualization framework 26 would not ordinarily conform to a structured database. In this scenario, the open data layer module 12 will enter the data into a metadata file to protect the user data and enable it to be able to be retrieved at a later date.

In one example, a user interacting with the system 10, may need to know the location of all units or nodes within a given area. Thus, a query could be entered into the system identifying or directing the user where all the units are in a given area. Alternatively, the user may instruct the system to search for all of the units in a given area and the system may tell the user whether units are hostile or it may detect underlying patterns in the data. The system can also match text entry queries. For example, the system may query the name of a person that is intended to be identified and the translation layer can then search every database by translating the text query from the user input into the appropriate underlying programming code to find similar or matching names associated with the query.

With respect to programming of the open data layer module 12, the programming thereof overcomes some exemplary problems associated with the fact that different disparate databases or different disparate providers do not always support searching or data entry in the same manner. For example, an exemplary system 10 of the present disclosure is able to provide capability to the user that is not supported by the underlying database then the system ensures and determines a way that it can ensure a user can query data across all of the available disparate database sources. If the open data layer module 12 encounters a query or a requested data entry that would not otherwise be commensurate with the underlying database, the open data layer module 12 enters the information to the best of its ability. For example, a user interacting with the visualization framework 26 may request to receive all records that have a certain key at a certain value. If the underlying database does not have said key then the open data layer module 12 recognizes that the user is searching for something that is not readily available in the underlying database. The open data layer module 12 then takes the value of that key and performs a text search across all of the data fields to ensure that it is still meeting the idea of the user's query without breaking.

The open data layer module 12 may have an open ontology. The open ontology allows the open data layer module 12 to be swapped between various applications. Stated otherwise, the open ontology allows the open data layer module 12 to easily transition between government applications and commercial applications. Open ontology refers to a description of the data and the data hierarchy. The open ontology represents ways of translating and understanding the structure of the language to help the user to better query and have a better idea of what different attributes and different types of data refer. Furthermore, open ontology refers to the system being able to receive new information into its ontology hierarchy. This allows for some algorithms and instructions to do inferencing to better work for future data entries and queries.

The distributing message framework has named topics. Named topics are links or places within the system that data is to connect. For example, if there are errors then these errors would be placed onto an alert channel, which may be along link 42 between the messaging bus 22 and the visualization framework 26. The visualization framework 26 can be connected to the alert channel to alert the user of the error. If there is data that needs to be ingested into the database, then the distributing messaging system can place it into an ingestion link 44 that is coupled with the open data layer module 24. Then the open data layer module 12 receives the data to be ingested and translates it through the translation layer 14 to store it into one of the underlying databases.

In one particular embodiment, the open data layer module 12 is any software module that can be installed anywhere on any type of device and ran in any scenario. In one particular embodiment, the open data layer module 12 is a collection of spring boot outs which are Java applications that can be built once and ran anywhere on any type of computing environment. Typically, the hardware would be part of the infrastructure as a service layer or platform as a service layer to store the open data layer module. Thus, the open data layer module may be considered a container that is run on a container server or a machine set up for a specific purpose. The open data layer module provides flexibility depending on what the environment that the user would have or would want to be. Stated otherwise, the open data layer module can run on a machine, run in the Cloud, run on a Pivotal Cloud Foundry, or any other computing environment capable of running or executing a Java platform.

The system of the present disclosure is infrastructure agnostic. Stated otherwise, the system of the present disclosure can run in the Amazon Cloud, can run in a eucalyptus, or in a terminal machine. The infrastructure can be any sufficient computing environment that would enable the system to operate. Thus, any infrastructure as a service (IAAS) 58 will suffice.

Figure 2:
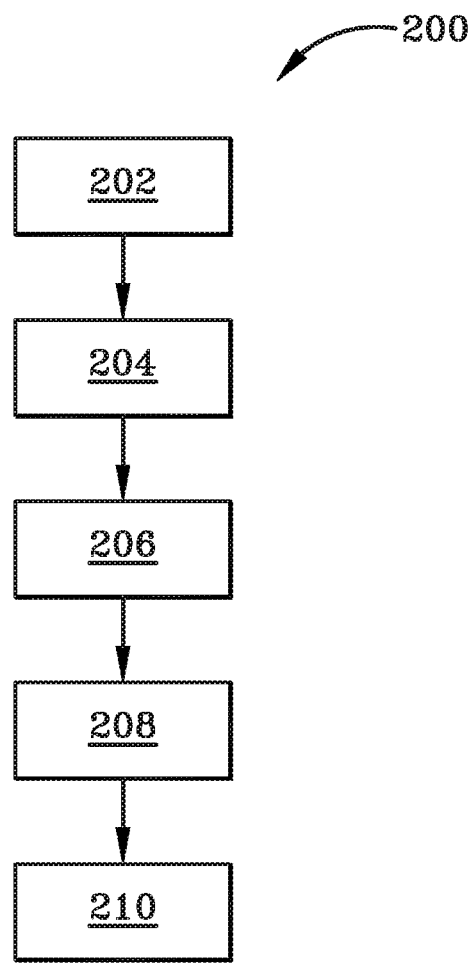
FIG. 2 is a flow chart depicting an exemplary method in accordance with one aspect of the present disclosure.

FIG. 2 is a flow chart that depicts an exemplary method 200 in accordance with and in furtherance to the operational description provided above. Method 200 may include ingesting a first set of data in a first format into an open data layer module, which is shown generally at 202. Method 200 may include translating the first set of data into a second format via a translation layer in operative communication with the open data layer module based on a translation flag associated with the second format, which is shown generally at 204. Method 200 may include generating, via the open data layer module, a query for the first set of data in the second format based on requirements of a replaceable backend database, which is shown generally at 206. Method 200 may include engaging the first set of data in the second format with the replaceable backend database in operative communication with the open data layer module and the translation layer, which is shown generally at 208. Method 200 may include maintaining a common user interface within a plurality of displays respectively within a plurality of nodes across an echelon network during translation of first set of data from the first format into the second format, which is shown generally at 210.

Replacing the first backend database could be performed when a user of the system decides that another data base offers more desirable features than the first backend database. For example, as discussed above, it may be desirable for a user to first use a database that has a structure data entry format to meet its application specific needs. Then, after some time, the application specific needs of the user may change. At this point, the user may decide that swapping the first backend database for a second backend database is warranted in order to conform with on-going application specific needs of the user. In some instances, when the databases are replaced, the data from the first database may be ported, sent, or otherwise indirectly or directly transferred from the first database to the second database.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a UI. Examples of output devices that can be used to provide a UI include printers or display screens for visual presentation of output and speakers or other sound generating devices for audible presentation of output. Examples of input devices that can be used for a UI include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Module", as used herein, includes but is not limited to hardware, firmware, software and/or combinations of each to perform a function(s) or an action(s), and/or to cause a function or action from another logic, method, and/or system. For example, based on a desired application or needs, the module may include a software controlled microprocessor, discrete logic like a processor (e.g., microprocessor), an application specific integrated circuit (ASIC), a programmed logic device, a memory device containing instructions, an electric device having a memory, or the like. Module may include one or more gates, combinations of gates, or other circuit components. module may also be fully embodied as software. Where multiple modules are described, it may be possible to incorporate the multiple modules into one physical module. Similarly, where a single module is described, it may be possible to distribute that single module between multiple physical module.

Furthermore, the module(s) presented herein for accomplishing various methods of this system may be directed towards improvements in existing computer-centric or internet-centric technology that may not have previous analog versions. The module(s) may provide specific functionality directly related to structure that addresses and resolves some problems identified herein. The module(s) may also provide significantly more advantages to solve these problems by providing an exemplary inventive concept as specific module structure and concordant functionality of the method and system. Furthermore, the module(s) may also provide specific computer implemented rules that improve on existing technological processes. The module(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A computer program product including one or more non-transitory machine-readable mediums encoded with instructions that when executed by one or more processors cause a process of computing data layer system to be carried out, the process comprising:
    ingesting a first set of data in a first format into an open data layer module;
    translating the first set of data into a second format via a translation layer in operative communication with the open data layer module based on a first translation flag in the translation layer associated with the second format;
    corresponding the second format to a first query language of a replaceable backend database in operative communication with the open data layer module and the translation layer, wherein the first translation flag corresponds to the replaceable backend database; and
    corresponding a second translation flag to a second backend database, wherein the second backend database is in operative communication with the open data layer module and the translation layer, and wherein the first translation flag is swapped with the second translation flag after the replaceable backend database is removed and the second backend database is connected to the open data layer module.

2. The computer program product of claim 1, further comprising:
engaging a user interface (UI) in operative communication with the open data layer module that remains unchanged after the replaceable backend database has been replaced by the second backend database.

3. The computer program product of claim 2, further comprising:
a plurality of nodes within a plurality of echelon layers; and
a plurality of links that couple at least some of the plurality of nodes within the plurality of echelon layers together;
wherein the process further compromises:
hiding both the replaceable backend database and the second backend data base from a user via the UI, and the UI appears similar on at least two different nodes within the plurality of nodes.

4. The computer program product of claim 2, wherein the translation layer integrates with the UI and is adapted to add databases to the computing data layer system without the need to construct a new data layer to add one database.

5. The computer program product of claim 1, wherein the translation layer includes code to integrate and interface with both the replaceable backend database and the second backend database, wherein the code is different for each respective backend database.

6. The computer program product of claim 1, further comprising:
receiving new data that is translated in the translated layer via a messaging bus coupled to the open data layer module to feed data into the open data layer module; and
generating query data from the new data by the translation layer to query data in one of the replaceable backend database and the second backend database.

7. The computer program product of claim 6, further comprising:
placing errors on an alert channel coupled with a visualization framework via the messaging bus, wherein the alert channel is coupled to output links of the messaging bus.

8. The computer program product of claim 1, wherein the replaceable backend database and the second backend database are disparate databases, and the translation layer translates data for input into the replaceable backend database and the second backend database, respectively.

9. The computer program product of claim 1, wherein the translation layer comprises:
a flexible query language; and
a data structure corresponding to the flexible query language adapted to be used throughout an entirety of the computing data layer system.

10. The computer program product of claim 9, further comprising:
corresponding a common query language with the UI; and
parsing the common query language and applying a parsed query into the flexible query language via a parser.

11. The computer program product of claim 1, further comprising:
receiving a plurality of input streams, wherein a pipeline module coupled to the plurality of input streams is configured to receive the plurality of input streams therein, wherein the pipeline module is a visual pipelining tool receiving drop boxes therein when data moves through the pipeline module and alters the data such that that pipelines of data translate the data into a common data model; and
ingesting the common data module, wherein a messaging bus coupled to the open data layer module and coupled to the pipeline module receives the common data model, wherein the messaging bus is a distributed messaging system adapted to enable messages to be dropped onto the messaging bus and all of the applications connected to the system to see the common data model.

12. The computer program product of claim 11, further comprising:
a natural language processor coupled with the messaging bus adapted to receive text documents and identify entities in a manner that can be extracted in a structured document.

13. The computer program product of claim 1, further comprising:
connecting the translation layer to the replaceable backend database via a link, wherein the link is disposed at a farthest layer of the computing data layer system.

14. The computer program product of claim 1, further comprising:
utilizing a common application program interface (API) by a batch entity extraction and resolution module coupled to the open data layer module.

15. The computer program product of claim 1, further comprising:
retrieving results, wherein a visualization framework defining a user interface (UI) is in operative communication with the open data layer that query an entry through the open data layer module and the translation layer to retrieve results from the replaceable backend database without requiring a user to know a specific query language and underlying structure of the replaceable backend database.

16. The computer program product of claim 1, wherein the open data layer module is a container executed on a container server.

17. A method comprising:
ingesting a first set of data in a first format into an open data layer module;
translating the first set of data into a second format via a translation layer in operative communication with the open data layer module based on a translation flag associated with the second format corresponding to a first query language of at least one underlying backend database;
generating, via the open data layer module, a query for the first set of data in the second format based on query language requirements of the underlying backend database;
engaging the first set of data in the second format with the underlying backend database in operative communication with the open data layer module and the translation layer; and
maintaining a common user interface within a plurality of displays respectively within a plurality of nodes across an echelon network during translation of first set of data from the first format into the second format.

18. The method of claim 17, further comprising:
replacing the underlying backend database with a second backend database in operative communication with the open data layer module and the translation layer;
ingesting a second set of data in the first format into the open data layer module;

translating the second set of data into a third format via the translation layer based on a translation flag associated with the third format corresponding to a second query language of at the second backend database;

generating a query the for the second set of data in the third format based on query language requirements of the second backend database; and entering the second set of data in the third format into the second backend database.

* * * * *